Feb. 19, 1929.                                                1,703,020
H. SUIDA
PROCESS OF CONCENTRATING ACETIC ACID
Filed July 6, 1926
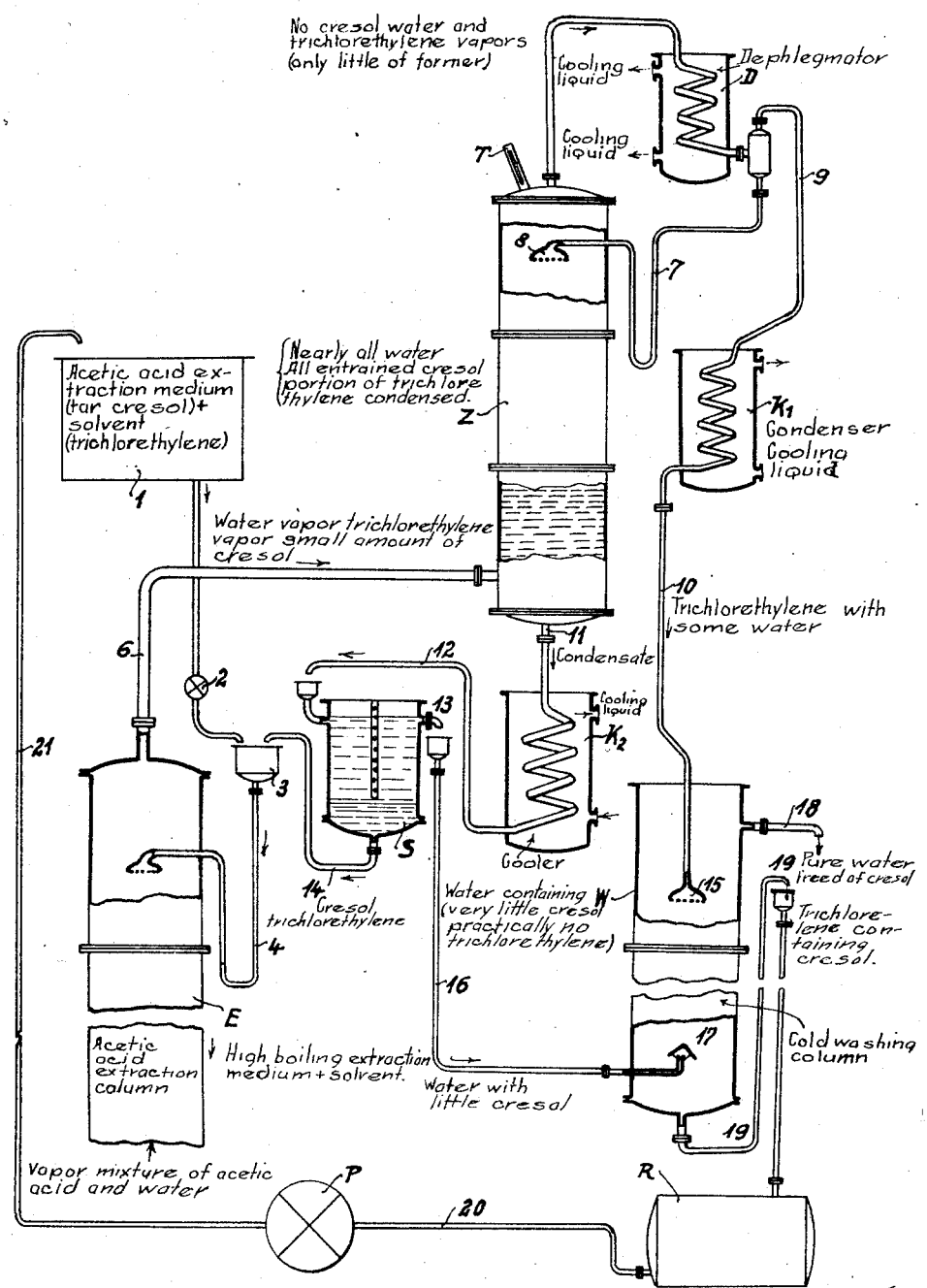
Inventor
Hermann Suida Patented Feb. 19, 1929.

1,703,020

UNITED STATES PATENT OFFICE.

HERMANN SUIDA, OF MODLING, NEAR VIENNA, AUSTRIA.

PROCESS OF CONCENTRATING ACETIC ACID.

Application filed July 6, 1926, Serial No. 120,862, and in Austria July 13, 1925.

From previous work by the applicant the preparation of concentrated acetic acid from dilute acetic acid by extracting the acetic acid from a superheated mixture of acetic acid and water vapour by means of extraction media which are sparingly soluble or insoluble in water and have a boiling point substantially higher than that of acetic acid is known. In this process, the water vapours, free from acetic acid, issuing from the apparatus, carry off a portion of the extraction medium, since most of the extraction media used for the process volatilize with water vapour. In order to effect the complete recovery of these portions of the extraction medium which are carried away in the water vapour, the applicant has hitherto allowed the water vapour issuing from the acetic acid extractor to settle down in a separator, after condensation, a portion of the removed extraction medium then separating from the water. Those portions of the extraction medium which remain dissolved in the water were then recovered by a separate extraction by means of another solvent, this latter necessarily possessing a high power of dissolving the acetic acid extraction medium, but being itself insoluble in water. In contrast to the aforesaid acetic acid extraction media, this liquid will be hereinafter termed "solvent."

The extraction media for acetic acid comprise aromatic compounds containing hydroxyl groups, and therefore chiefly phenols and mixtures thereof, such as cresols, polyvalent phenols, especially in the form of their ethers (guaiacol and homologues), and so on (see my copending application Ser. No. 12,180).

As the solvent for recovering the aforesaid acetic acid extraction medium from the water chlorinated aliphatic hydrocarbons having a boiling point below 100° C., viz solvents containing chlorine, such as trichlorethylene, chloroform carbon tetrachloride, ethylene chloride etc. may be used.

After the acetic acid extraction medium had been recovered from the water, it was necessary to separate said extraction medium (for example, tar cresol) from the solvent (for example, trichlorethylene). With this object in view, use was made of a distillation apparatus, by means of which the fractional distillation and separate condensation of the extraction medium and solvent were effected.

A process will now be described in which the hitherto necessary independent separation of the extraction medium and the solvent by distillation can be dispensed with, the solvent being added to the acetic acid extraction medium during the stage of extracting the acetic acid, in which case the whole of the solvent, together with a portion of the extraction medium, volatilizes along with the water vapour. Then, instead of jointly condensing the whole of the vapours issuing from the acetic acid extracting column, as hitherto, the vapours are subjected, according to the invention, to a certain fractionation during the condensation, and thus furnish, on the one hand, a condensate "A" containing nearly the whole of the water and extraction medium, together with a portion of the solvent; while the other condensate "B", consists of pure solvent, free from extraction medium, in admixture with a little water. If the condensate "A" be allowed to settle, two layers are obtained, one of which consists of a mixture of extraction medium and solvent, and can be returned direct to the acetic acid extraction column. The other consists of water and small quantities of dissolved extraction medium which is recovered from the water by passing it through a washing column in counterflow with the condensate "B". This treatment gives, on the one hand, pure water, which issues from the column on the one side, and, on the other hand, a mixture of extraction medium and solvent which is passed directly into the acetic acid extraction column. Further advantages and details of the process will be set out below.

The accompanying drawing represents diagrammatically a typical plant adapted to carry out the process according to the invention.

Regulated by the cock 2, the tank 1 furnishes a continuous supply of a mixture of an acetic acid extraction medium (such as tar cresol) and solvent (for example trichlorethylene), which passes by way of the funnel 3 and syphon 4 to the spraying nozzle 5 in the acetic acid extraction column E containing an ascending current of the vapours of dilute acetic acid. The mixture of the vapours of water, trichlorethylene and a small amount of entrained cresol, escapes through the pipe 6. These vapours enter, at the side, into the lower end of an auxiliary column Z, which is provided with false bottoms, rings or other fillings. The dephlegmator D, which is served by a cooling liquid of any kind and may at the same time be used for preheating, sprays and cools the auxiliary column Z by means of the pipe 7 and distributor 8, and can easily be adjusted in such a way that the temperature (indicated by the thermometer T at the head of said auxiliary column) is kept at such a level that no cresol passes off through the pipe 9, but only the vapours of trichlorethylene and water (the latter in very small amount), these vapours being completely condensed in the condenser K' and discharged continuously through the pipe 10. By the cooling action of the dephlegmator D that is, through the strong reflux set up in the column Z, nearly the whole of the water entering the column Z in the form of vapour, through the pipe 6, is condensed together with all the abstracted cresol and a portion of the trichlorethylene. The condensate runs away continuously through the branch 11 at the lower end of the column Z, is suitably cooled in the condenser K² (which may also be used as a preheater), and passes thence through the pipe 12—which, in conjunction with the condenser K², forms the hydraulic seal of the column Z—into the separator S, in which the water deposits spontaneously, while the specifically heavier mixture of abstracted cresol and trichlorethylene flows continuously through the pipe 14 to the funnel 3 and is thereby returned automatically to the extraction process in the extraction column E. The presence of trichlorethylene in the condensate of the condenser K² greatly facilitates the separation of the cresol from the water in the separator S. The water runs away perfectly clear at 13, and now contains only a very little dissolved cresol and practically no trichlorethylene. Two currents of liquid issue from the apparatus. The one, running away through the pipe 10, consisting of pure trichlorethylene and a very little water, free from cresol, flows continuously into the top of the cold washing column W, through the distributor 15; while the other, consisting of water with a little dissolved cresol, and coming from 13, enters the lower end of the washer W through the pipe 16 and distributor 17. Being specifically the lighter, the liquid entering through 17 ascends, while the specifically heavier liquid entering at 15, sinks. Complete intermingling and lixiviation are effected in this washing column, so that water alone, freed from cresol, issues from the upper end of the washing column at 18, while the whole of the trichlorethylene entering through 10 and 15, enriched with the cresol completely extracted from the water, issues from the lower end of the washing column and flows upward through the pipe 19 into the tank R. From this latter is sent back into the tank 1, either continuously or periodically, through the pipe 20 and the pump P, and is thus returned to the extraction process.

If, for example, the operation be carried on with a mixture of 2 parts of cresol and 1 part of trichlorethylene, the dephlegmator D may preferably be adjusted so that about 50-60% of the trichlorethylene vapour flowing into the column Z escapes, in the form of vapour, through the pipe 9 and, after passing through the condenser K', flows through the pipe 10 to the cold washer, while the remaining 50-40% of the trichlorethylene taken is condensed, with the water and the whole of the entrained cresol, in Z, then cooled in K² and passed into the separator. In such event, the trichlorethylene passing to the cold washer through the pipe 10 will be in quite sufficient amount to extract the residual cresol completely from the counterflow of water issuing from the separator S at 13.

If, in place of the above ratio of 2:1, the ratio 1:1 or 4:1 be taken, the percentage proportion of pure trichlorethylene removed by the condenser K' will be varied accordingly, the variation being capable of being effected at any time by adjusting the dephlegmator D, that is, the temperature drop in the column Z. If chloroform or carbon tetrachloride be used in place of trichlorethylene, that is to say, solvents of still lower boiling point, all that is needed is to modify the cooling surface of the dephlegmator, that is, the capacity of the column Z accordingly. The arrangement of the plant, as shown in the drawing, may be modified in various ways and represents merely one form of apparatus for carrying out the process.

In the method of working described, the following beneficial secondary effects are obtained, in addition to the previously mentioned advantages of dispensing with one distillation. The presence of the solvents of low boiling point in the acetic acid extraction column and vaporizing in the upper part of the column, lowers the temperature in that part of the column, a circumstance favourably influencing the extraction, so that by operating in this manner, the acetic acid content of the water vapour issuing from the column is reduced to 0.01%. Moreover, the circumstance that the whole of the added solvent is distilled off with the water vapour, greatly lessens the quantity of entrained extraction medium, so that a far smaller amount of said medium than hitherto is left in and has to be recovered from the water. Finally, the addition of the solvent causes a more effectual separation of the water and extraction medium when allowed to settle.

What I claim is:

1. The process which comprises subjecting the vapor mixture of a fatty acid and water to the action of a high boiling phenolic body in the presence of a low boiling organic chlorine compound, partially condensing the water vapor from the extraction which has been freed of acetic acid but which contains a large amount of the low boiling organic chlorine compound and small amount of the high boiling phenolic body, allowing said condensate to separate into an aqueous layer containing a small quantity of the phenolic body, but practically no chlorine body and into another layer containing practically all the chlorine body and most of the phenolic body, then extracting the water layer containing the small quantity of the phenolic body by means of the condensate resulting from condensation of the vapor mixture which remains after the partial condensation process, said vapor mixture containing principally the chlorine compound with a little water and no phenolic body to obtain water which is freed of phenolic body and the chlorine compound containing the residual phenolic body.

2. The process of claim 1 in which the high boiling phenolic body is tar cresol.

3. The process of claim 1 in which the fatty acid is acetic acid.

4. The process of claim 1 in which the low boiling solvent is a chlorinated aliphatic hydrocarbon having a boiling point below 100° C.

5. The process of separating a vapor mixture of water and chlorinated hydrocarbon, said mixture containing a small amount of a high-boiling phenolic body which comprises partially condensing said vapor mixture to give a condensate, then condensing the vapors given off from this partial condensation step, allowing the first condensate to settle into an aqueous layer containing a small amount of the phenolic body and none of the chlorine compound, and into a layer containing practically all of the phenolic body and chlorine compound, extracting the water layer containing the small amount of phenolic body by means of the second condensate containing the chlorine compound with a little water, to obtain a water freed of the phenolic body and the chlorine compound containing all of the phenolic body.

6. The process of extracting a fatty acid from dilute solution which comprises treating said solution in a vaporized state with a mixture of an extraction medium having a high boiling point as compared to that of acetic acid and a solvent for the extraction medium having a low boiling point.

7. The process of extracting a lower fatty acid from dilute aqueous solution which comprises evaporating the said solution, subjecting the mixture of fatty acid vapor and water vapor to the action of a phenolic compound having a high boiling point as compared to that of acetic acid and an organic chlorine compound having a low boiling point.

8. The process of concentrating acetic acid which comprises subjecting a vapor mixture of acetic acid and water to the action of an extraction medium having a high boiling point as compared to that of acetic acid and a solvent for the extraction medium having a low boiling point.

9. The process of claim 8 in which the high boiling extraction medium is tar cresol and the low boiling solvent is trichlorethylene.

10. A method of concentrating acetic acid which comprises extracting a mixture of acetic acid and water vapors by means of an extraction medium of low boiling point in presence of a solvent of low boiling point, separating the vapors coming from the extraction step into one readily condensed portion containing nearly the whole of the water together with the whole of the acetic acid extraction medium and a portion of the solvent of low boiling point and into a second portion, difficult to condense, consisting of the pure solvent and a little water.

11. The process of claim 10 in which the condensate composed of water, the extraction medium and the solvent is allowed to subside, the water is drawn off and the residual extraction medium dissolved in the water is extracted by washing with the condensate composed of the solvent and a little water, and the extract is then returned to the acetic acid extraction process together with the mixture of the extraction medium and solvent spontaneously separated from the water decomposition.

HERMANN SUIDA.